Jan. 12, 1932. H. A. EARNEST 1,841,318
TERMINAL LOCK FOR FLEXIBLE TUBING
Filed June 10, 1930
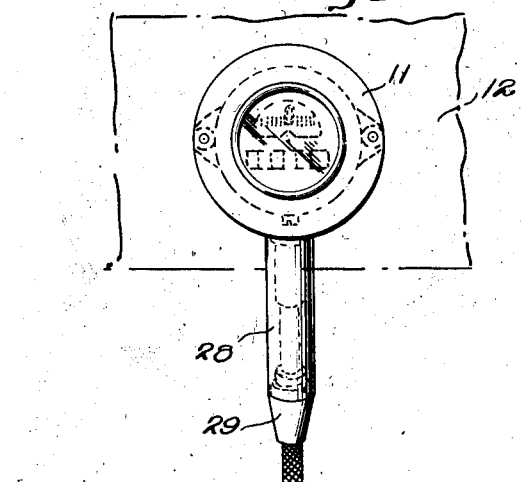
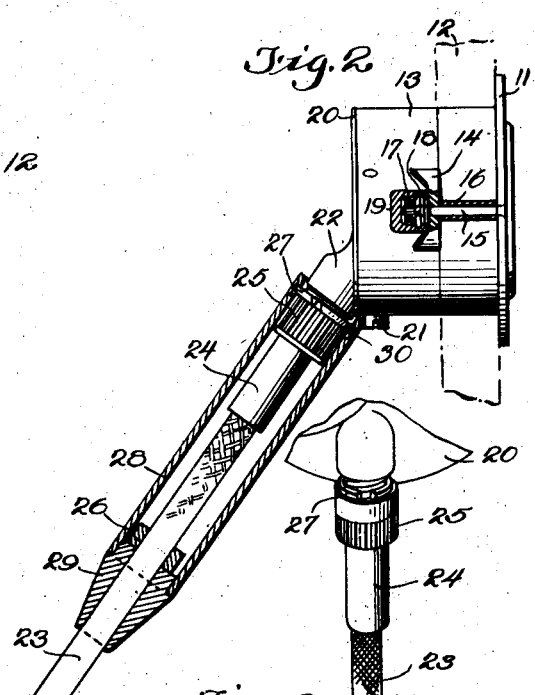
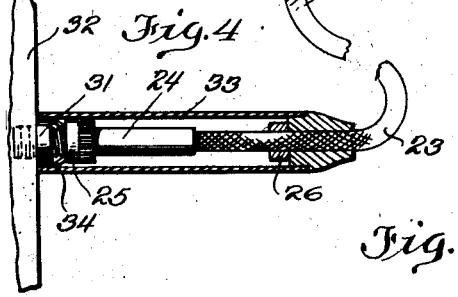
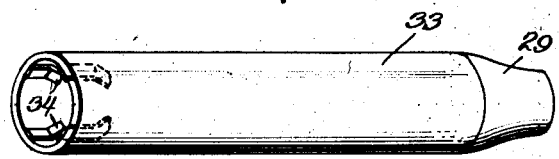
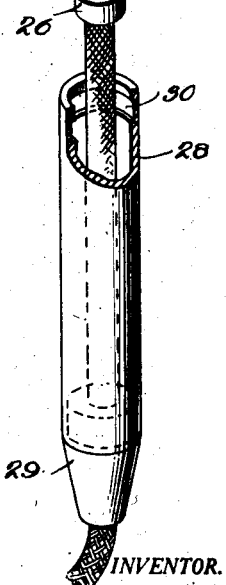
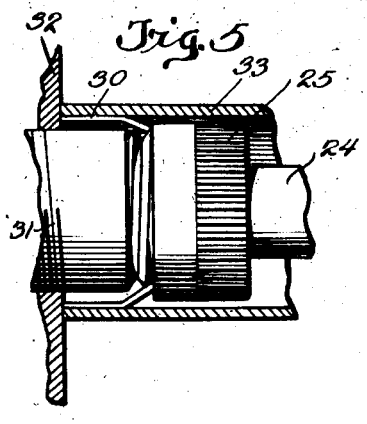
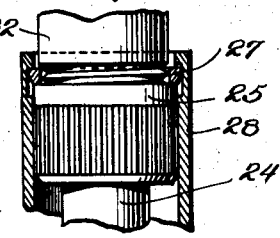
INVENTOR.
H. A. Earnest
BY
ATTORNEY.

Patented Jan. 12, 1932

1,841,318

UNITED STATES PATENT OFFICE

HARRY A. EARNEST, OF LANCASTER, PENNSYLVANIA

TERMINAL LOCK FOR FLEXIBLE TUBING

Application filed June 10, 1930. Serial No. 460,187.

This invention is addressed to the provision of novel and improved locking means for the terminals of flexible tubing. There are many conditions in which it is desirable to insure that the coupling of a flexible tubing is not disconnected without proper authority. As an example of such a circumstance I have illustrated my invention as applied to a speedometer drive. Speedometers are frequently relied upon to register accurately distances, numbers of rotation or operative movements. Where this is an object it is important to assure the registering device against unauthorized tampering or the possibility of its being disconnected from the operating device which it is intended to register. An example of this condition occurs in the use of speedometers on automobiles which are used for hire or rented on the basis of the mileage traveled according to the registration of the speedometer. Any tampering with the speedometer which would interfere with the normal drive connection between the speedometer and the driving mechanical element is of course to be guarded against and my invention provides a simple and effective means for locking the terminal connections between the speedometer and the driving element.

It is also an object of my invention to provide an easily replaceable device of economical manufacture.

Other objects of my invention will be evident from the following description of the preferred form of my invention as illustrated in the accompanying drawings in which:

Fig. 1 is a front elevation of a speedometer and the upper end of the flexible drive;

Fig. 2 is a side elevation of the same partly in section;

Fig. 3 is a rear elevation of the same with the locking sleeve in a free position;

Fig. 4 is a longitudinal section of the opposite or lower locking connection;

Fig. 5 is an enlarged fragmentary section of the latter;

Fig. 6 is an enlarged fragmentary section of the upper connection and;

Fig. 7 is a perspective view of the locking sleeve.

By way of illustration I have shown the invention as embodied in the flexible drive connection between a speedometer and the driving element in the transmission gear. The speedometer face plate 11 is customarily mounted on front of a dash board 12 which may be of varying width up to the limit indicated in Fig. 2. The speedometer casing 13 passes through a hole in the dash board 12 and carries lugs 14. Holding bolts 15 are brazed, riveted or otherwise attached to the face plate 11 and connect the latter through the dash board with the lugs 14. To prevent any irregular tightening of the bolts 15, the latter carry spacers 16. The ends of the bolts 15 carry grooved nuts 17 by which the bolts are tightened to the limit permitted by the spacers 16. Each grooved nut 17 carries a split ring 18 in the groove and by means of an internally grooved cap 19 the split ring 18 forms a lock which prevents access to the nut 17. The cap 19 will of course be free to rotate without loosening the nut 17.

The back 20 of the speedometer casing is attached to the latter by means of nuts 21, some or all of which may be without heads as indicated in Fig. 2, being finished level with the outer surface of the casing to prevent any removal by the usual tools. The back 20 has a screw threaded fitting 22 which is adapted to surround the operating flexible shaft and also to receive the union on the flexible tubing in which the shaft rotates.

As a cover for the flexible drive shaft I use a metallic interwoven flexible armored tubing 23 of well known manufacture and characterized by its ability to prevent longitudinal extension or sharp bending.

Each end of the armored tubing carries a union which consists in part of a collar 24 riveted or otherwise applied firmly to the ends of the tubing 23. The collar 24 is flanged at the free end to limit the free sliding thereover of the knurled nut 25. This nut is threaded on the fitting 22 in the customary manner to bring the collar and fitting in direct contact with the end of the flexible drive shaft interlocking with the speedometer drive.

A stop 26 is soldered, keyed or otherwise attached on the tubing 23 and in spaced relation with the collar 24. This stop forms an abutment for the locking element later to be disclosed. Split ring 27 is assembled on the fitting 22 prior to the attachment of the knurled nut 25.

The tubing 23 also carries an upper locking sleeve 28. This sleeve is tubular in form and the rear end is reduced by flanging, swaging, upsetting or otherwise to form an abutment 29 against the stop 26 when the free end of the sleeve projects the desired length beyond the knurled nut 25. The free end of the sleeve 28 has an internal groove 30 adapted to receive the split ring 27. The sleeve 28 is of course assembled upon the tubing 23 prior to the attachment of the union although it is equally feasible to apply the sleeve 28 as an open ended tubing and thereafter flange the rear end 29 to form an abutment for the stop 26.

The opposite end of the tubing 23 carries a similar union collar 24 and knurled nut 25. This union is adapted to connect with the screw threaded fitting 31 on the transmission housing 32 or similar support for the gear which drives the flexible shaft. In like manner a second stop 26 is provided at this end of the tubing 23. The lower locking sleeve 33 is generally of the same form and function as that above described for the upper locking sleeve. A modified form of locking means, however, is shown in Fig. 4 where the sleeve at its free end carries inwardly disposed and directed spring fingers 34 which are adapted to ride over the knurled nut 25 and lock against the rear edge of the latter.

The operation and utility of the above device will be readily apparent. The flexible tube of armored type is supplied with the upper and lower sleeves 28 and 33 respectively. With the sleeves in retracted position as shown in Fig. 3 the unions are connected to the fittings 22 and 31. The split ring 27 has previously been applied to the fitting 22. The sleeve 28 may then be slid along tubing 23 over the knurled nut 25 and into engagement with the split ring 27. At this moment the stop 26 serves to hold the sleeve and the tubing 23 from free longitudinal movement. The sleeve 28 and the split ring 27 completely cover the knurled nut 25 and prevent its being reached for unscrewing. It is to be understood that the sleeve 28 is freely rotatable around the knurled nut 25. It is, therefore, impossible for the tubing to be disconnected from the fitting or to be stretched sufficiently to disengage the coupling of the flexible shaft. The end 29 of the sleeve projects far enough to be readily visible on inspection and also to prevent undesirable sharp bends of the shaft near the fitting 22.

In like manner the opposite end of the tubing 23 can be applied by means of the knurled nut 25 to fitting 31 after which the sleeve 33 is caused to ride over the knurled nut until the spring fingers 34 engage the edge of the latter. The sleeve 33 serves to prevent sharp bends at this end of the shaft and also prevents either the disengagement of the shaft by pulling the tubing out or the disconnection of the knurled nut from the fitting.

The result is that the speedometer drive is positively connected to the rotating element which it is desired to register without danger of unauthorized disconnection or breakage.

While I have described the preferred form of my invention it is apparent that numerous changes in minor details may be carried out within the scope of my invention as defined in the following claims.

What I claim is:

1. In combination with a coupling fitting, a flexible armored tubing, a coupling member on one end of said tubing, guard means slidable along said tubing and concealed locking means for locking said guard means over said coupling fitting and member.

2. In combination with a coupling fitting, a flexible armored tubing, a coupling member on one end of said tubing, a stop on said tubing, guard means slidable along said tubing over said stop and concealed locking means for locking said guard means over said coupling fitting and member.

3. In combination with a fitting, a flexible tubing, a union on the end thereof comprising a collar and a nut, a sleeve slidable on the tubing, a restricted end on the sleeve, and concealed locking means for locking the other end of the sleeve over the union.

4. In combination with a fitting, a flexible tubing, a union on the end thereof comprising a collar and a nut, a sleeve slidable on the tubing, a restricted end on the sleeve, a stop on the tubing for said restricted end and concealed locking means for locking the other end of the sleeve over the union.

5. In combination with a screw-threaded fitting, a flexible tubing, a union on the end thereof comprising a collar and a nut for attachment to the fitting, a sleeve slidable on the tubing, said sleeve having an internal groove and a concealed resilient ring on the fitting for locking engagement with said groove beyond said nut.

6. In combination with a screw-threaded fitting, a flexible tubing, a union on the end thereof comprising a collar and a nut for attachment to the fitting, a sleeve slidable on the tubing, and concealed resilient means carried within one end of the sleeve for locking engagement over the end of the nut.

7. In combination, a register casing, means for locking the casing, a fitting on the casing, a housing for a movable element, a fitting on the housing, a flexible tubing, a coupling at each end of the tubing for connection with said fittings, guards on the tubing and concealed locking means for locking a guard over each coupling.

8. In combination, a register casing having a fitting, a housing having a fitting, a flexible tubing, a union comprising a collar and a nut for the fittings at each end of the tubing, sleeves on the tubing and concealed locking means for locking each sleeve over a nut.

9. In combination, a register casing having a fitting, a housing having a fitting, a flexible tubing, a collar and nut for a fitting at each end of the tubing, a stop spaced from each end of the tubing, sleeves on the tubing and concealed means for locking each sleeve in contact with a stop and a nut.

10. In combination, a register casing having a fitting, a housing having a fitting, a flexible tubing, a collar and nut for a fitting at each end of the tubing, a stop spaced from each end of the tubing, sleeves on the tubing and concealed resilient means carried by each sleeve for locking engagement against a nut.

11. In combination, a register casing having a fitting, a flexible tubing, concealed locking means for locking said tubing in engagement with the fitting, said casing being assembled from two or more parts and means for preventing the disassembly of said parts.

12. In combination, a register casing having a fitting, a flexible tubing, concealed locking means for locking said tubing in engagement with the fitting, said casing being assembled from two or more parts with bolts, and a locking cap for one of said bolts.

In testimony whereof, I affix my signature.

HARRY A. EARNEST.